United States Patent
Yamahira et al.

(10) Patent No.: US 7,511,559 B2
(45) Date of Patent: Mar. 31, 2009

(54) BOOSTER CIRCUIT (75) Inventors: Seiji Yamahira, Kyoto (JP); Toshiki Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 11/643,696

(22) Filed: Dec. 22, 2006

(65) Prior Publication Data
US 2007/0146054 A1 Jun. 28, 2007

(30) Foreign Application Priority Data
Dec. 22, 2005 (JP) ............... 2005-370615

(51) Int. Cl.
G05F 1/10 (2006.01)
(52) U.S. Cl. .................................... 327/536
(58) Field of Classification Search ................. 327/536, 327/537, 538, 540, 541, 543
See application file for complete search history.

(56) References Cited

U.S. PATENT DOCUMENTS 6,456,541 B2 * 9/2002 Tanzawa ................ 365/189.11
6,756,837 B2 * 6/2004 Kawai et al. ................. 327/536
6,912,159 B2 * 6/2005 Osawa et al. ............ 365/185.18
2001/0033515 A1 10/2001 Tanzawa
2002/0196673 A1 12/2002 Tanzawa
2005/0218966 A1 * 10/2005 Azuma et al. ................ 327/536

FOREIGN PATENT DOCUMENTS

JP 2003-250263 9/2003
JP 3670642 B2 4/2005

* cited by examiner

Primary Examiner—Lincoln Donovan
Assistant Examiner—Hai L. Nguyen
(74) Attorney, Agent, or Firm—McDermott Will & Emery LLP

(57) ABSTRACT

A pull-out lower limit voltage for setting a voltage level when the gate voltage of the charge transfer transistor is pulled out is supplied to a reset circuit. In order to secure the breakdown voltage margin of the transistor and the capacitor used in a booster cell, a voltage which is not necessarily constant is used as the pull-out lower limit voltage. Accordingly, it is possible to provide a stabilized booster circuit in which an optimal gate voltage level of the charge transfer transistor can be set, overcharging can be suppressed, and the recovery time of the booster circuit can be shortened.

13 Claims, 10 Drawing Sheets

BOOSTER CIRCUIT

BACKGROUND OF THE INVENTION

1. Field of the Invention

The present invention relates to a booster circuit which is used in a non-volatile semiconductor memory or a semiconductor integrated circuit.

2. Description of the Related Art

Recently, in a flash memory serving as a non-volatile storage device, it is required to read and rewrite data at single power supply voltage or low power supply voltage. Therefore, when the individual operations are performed, a booster circuit for supplying a boosting voltage or a negative boosting voltage is needed on chip.

Figure 10:
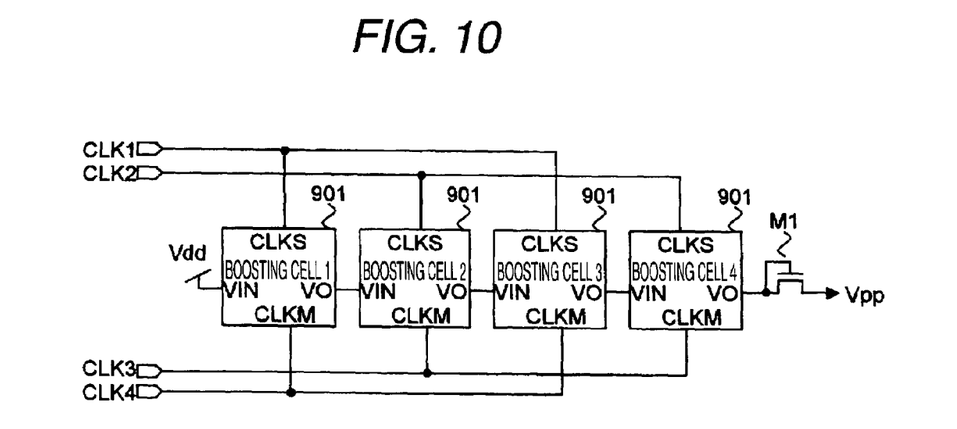
FIG. 10 is a block diagram illustrating a booster circuit according to the related art.
Figure 11:
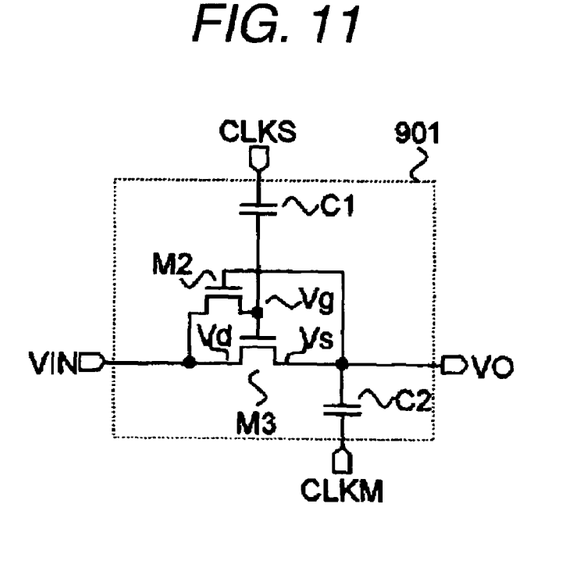
FIG. 11 is a diagram illustrating a booster cell in the booster circuit according to the related art.

FIGS. 10 and 11 are block diagrams illustrating the configuration of a booster circuit according to the related art.

The configuration of FIGS. 10 and 11 will be described. The booster circuit is configured by a plurality of booster cells 901 that are connected in series. Each of the booster cells 901 includes a charge transfer transistor M3, a switching transistor M2, a gate voltage boosting capacitor C1, and an output-voltage capacitor C2. The charge transfer transistor M3 transfers charges from the preceding stage to the following stage. The switching transistor M2 equalizes a gate voltage Vg of the charge transfer transistor M3 with a drain voltage Vd at the preceding stage so as to have the same potential. The gate voltage boosting capacitor C1 equalizes the gate voltage Vg of the charge transfer transistor M3 with the drain voltage Vd and then pumps up the gate voltage Vg to be synchronized with a clock CLKS such that the charge transfer transistor M3 is turned on. The output-voltage capacitor C2 turns on the charge transfer transistor M3 in accordance with the clock CLKS and then pumps up a source voltage Vs in accordance with a clock signal CLKM. FIG. 10 shows an example in which four stage booster cells 901 are connected in series. As the booster cells 901 pump up a power supply voltage Vdd, charges are transferred to the following stage, and an-output voltage Vpp is output through the reverse flow prevention circuit M1.

Figure 12:
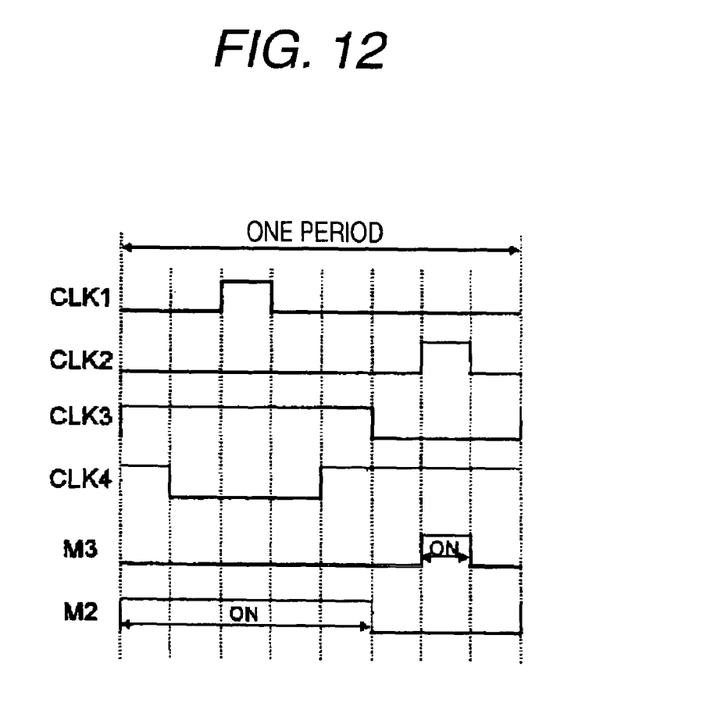
FIG. 12 is a timing chart of clocks applied to the booster circuit.

FIG. 12 shows four-phase clock signals CLK1 to CLK4 connected to the last stage booster cell 5 (901) and the operational states of the switching transistor M2 and the charge transfer transistor M3.

The last stage booster cell 4 receives the clock signals CLK2 and CLK3, and the charge transfer transistor M3 is turned on to be synchronized with the clock signal CLK2 so as to transfer charges from the preceding stage to the following stage, and to equalize the drain voltage Vd and the gate voltage Vg. Similarly, in the booster cells 2n (n is an integer equal to or larger than 1), the charge transfer transistor M3 is controlled to be synchronized with the clock signal CLK2, and the switching transistor M2 is driven to be synchronized with the clock signal CLK3. In the booster cells 2n−1 (n is an equal to or larger than 1), the charge transfer transistor M3 is controlled to be synchronized with the clock signal CLK1, and the switching transistor M2 is controlled to be synchronized with the clock signal CLK4.

Figure 13:
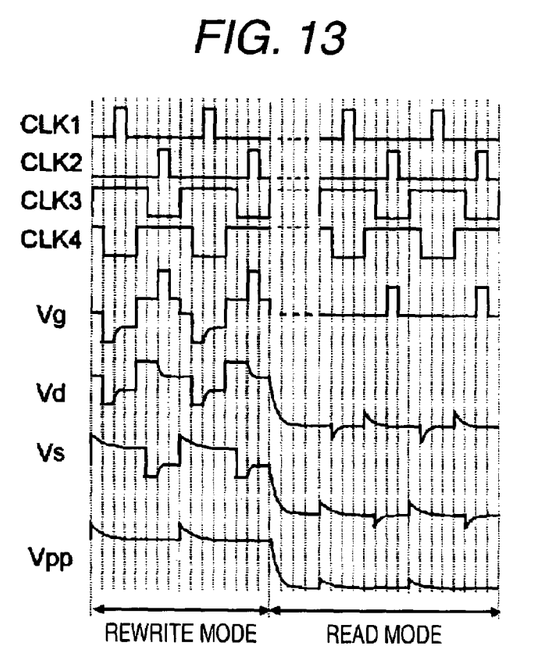
FIG. 13 is a timing chart of the booster circuit according to the related art.

The operation of the booster circuit configured in such a manner will be described hereinafter with reference to FIG. 13. FIG. 13 shows four-phase clock signals CLK1 to CLK4, the respective terminal voltages and an output voltage Vpp of the charge transfer transistor of the last stage booster cell 4.

When the clock signal CLK3 is H, the booster cell 4 equalizes the drain voltage Vd and the gate voltage V of the charge transfer transistor M3 through the switching transistor M2. Next, as the clock signal CLK3 is set to L, the booster cell 4 enters in a high-impedance (Hiz) state, while maintaining the high gate voltage Vg of the charge transfer transistor M3. As the clock signal CLK2 is changed to H from L, the booster cell 4 pumps up the gate voltage Vg to turn on the charge transfer transistor M3. Accordingly, the charge of the drain is transferred to the source. After the charge is transferred, the clock signal CLK2 is set to L, and the charge transfer transistor M3 is turned off. Then, as the clock signal CLK3 is changed to H from L, the source voltage Vs is further pumped up. Accordingly, the boosted voltage Vpp is output to the output terminal. In the state where the boosted voltage Vpp has been output, if the operation mode is switched over from the rewrite mode to the read mode, the output voltage Vpp transits from a high voltage to a low voltage.

At this time, the voltage levels of the source voltage Vs and the drain voltage Vd of the charge transfer transistor M3 decrease as the output voltage Vpp drops down. However, there is a case where the gate voltage Vg remains at the Hiz state depending on the timing of the clock signal CLK2 such that a high voltage is maintained. When the gate voltage Vg is a high voltage, the charge transfer transistor M3 is turned on. Accordingly, although the clock signal CLK3 is changed to H from L, the charge flows back from the source to the drain through the charge transfer transistor M3, and thus the source voltage Vs cannot be pumped up.

Figure 14:
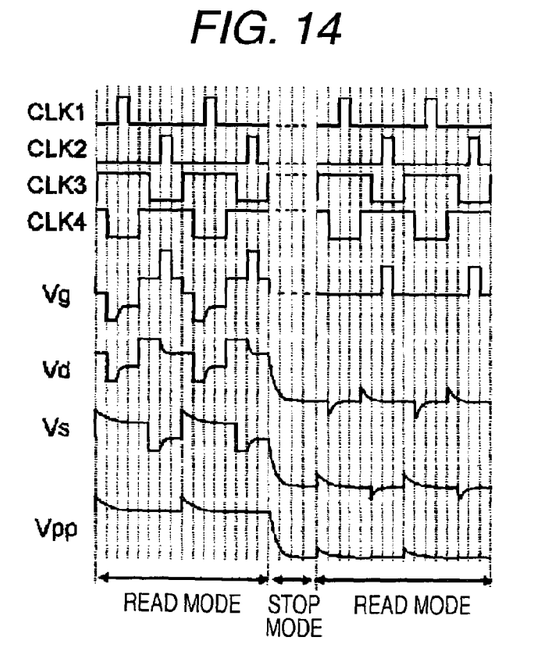
FIG. 14 is a timing chart of the booster circuit according to the related art.

The above problem may be also occurred when the operation mode transits from the rewrite mode, where the boosted voltage Vpp is output, to the STOP mode when the boosted voltage returns back to the power supply voltage, as shown in FIG. 14. At the read mode as the following transition mode, pumping efficiency decreases so that the significantly long recovery time is needed in the booster circuit.

In order to solve the above-described problem, Japanese Patent No. 3670642 has proposed a booster circuit.

Figure 15:
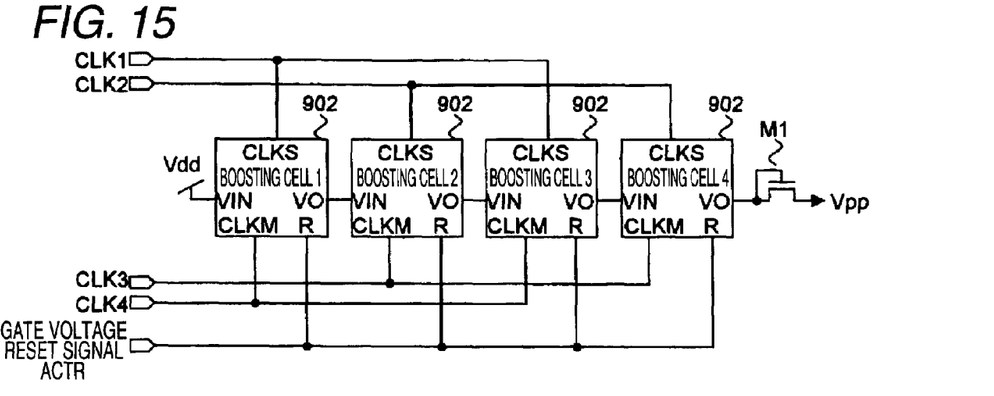
FIG. 15 is a block diagram illustrating a booster circuit according to the related art.
Figure 16:
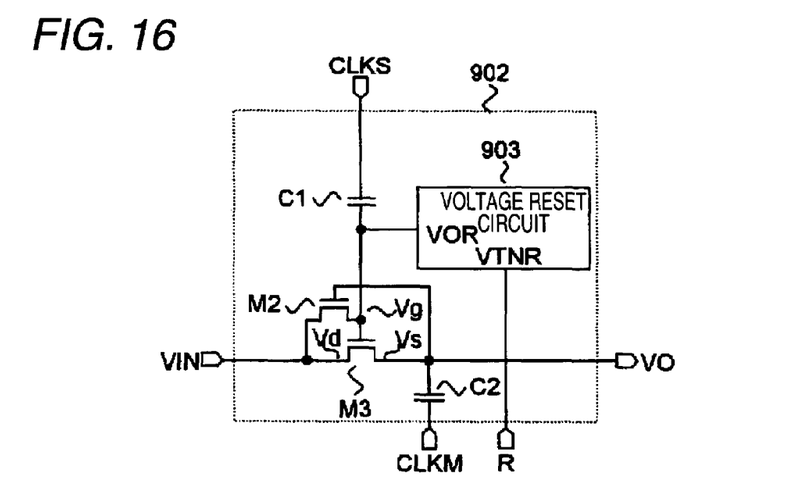
FIG. 16 is a diagram illustrating a booster cell in the booster circuit according to the related art.
Figure 17:
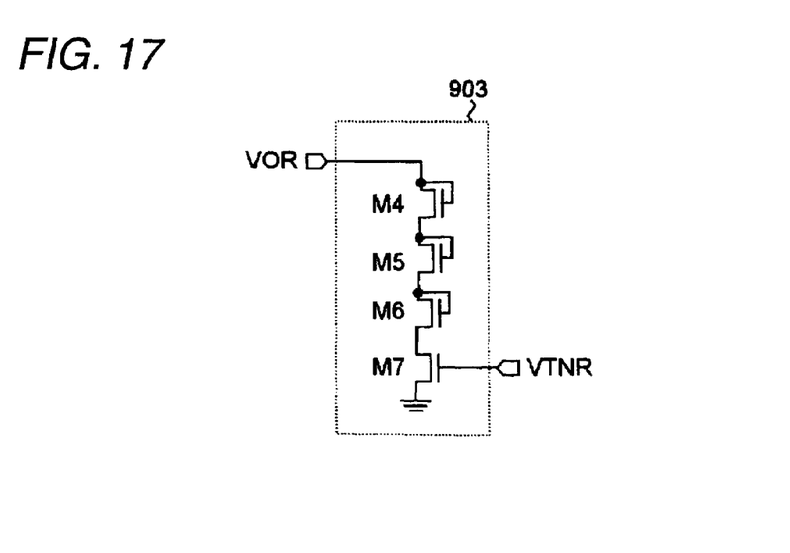
FIG. 17 is a diagram illustrating a voltage reset circuit in the booster circuit according to the related art.

FIGS. 15 to 17 show an example of the configuration shown in Japanese Patent No. 3670642.

Reference numeral 902 represents a booster cell provided with a reset circuit which pulls out a gate voltage of the charge transfer transistor in accordance with a gate voltage reset signal ACTR, and corresponds to the booster cell 901. Reference numeral 903 represents a voltage reset circuit which pulls out the charge of the gate voltage Vg of the charge transfer transistor to Vdd or higher in accordance with the gate voltage reset signal ACTR. The voltage reset circuit 903 is composed of diode-connected transistors M4, MS, and M6, which are provided in consideration of potential difference at the time of pulling out a charge, and a transistor M7 which is controlled in accordance with the gate voltage reset signal ACTR. Moreover, like reference numerals represent the same components as those of the above-described booster circuit.

An example of the circuit operation of the booster circuit of Japanese Patent No. 3670642 will be described.

When a boosting operation is performed by four-phase clock signals CLK1 to CLK4, the gate voltage reset signal ACTR is L. The booster cell 902 transfers a charge from the preceding stage to the following stage and performs a boosting operation, similar to the booster cell 901.

Figure 18:
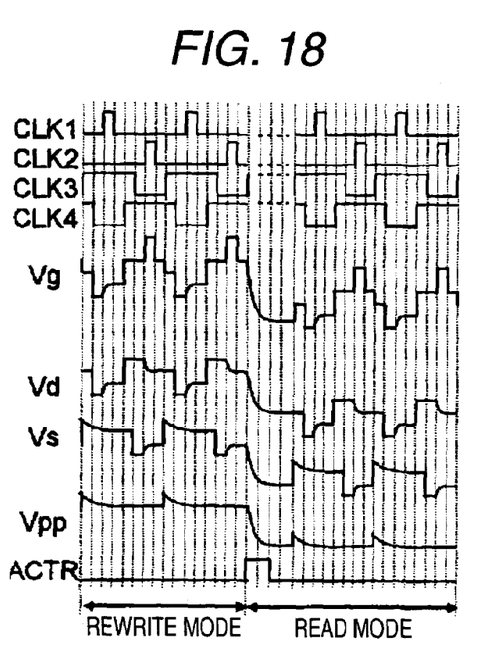
FIG. 18 is a timing chart of the booster circuit according to the related art.
Figure 19:
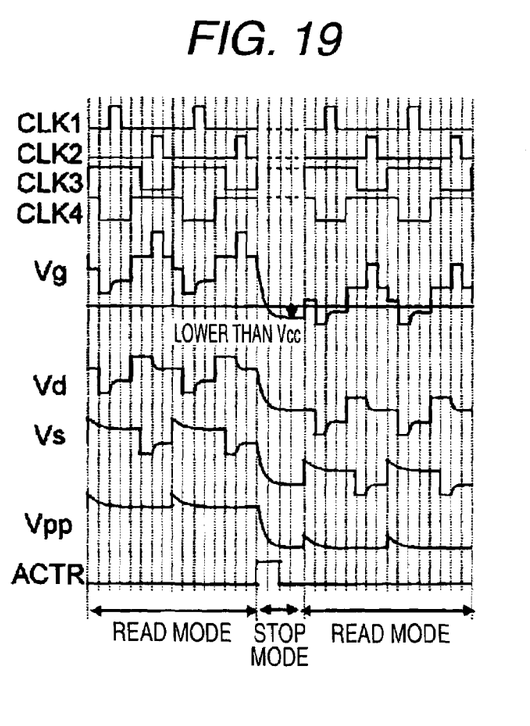
FIG. 19 is a timing chart of the booster circuit according to the related art.

As shown in FIG. 18, when the operation mode of the booster circuit transits from the rewrite mode when the boosted voltage is high to the read mode when the boosted voltage is low, the gate voltage reset signal ACTR becomes H. Accordingly, the voltage reset circuit becomes in an operation state such that the gate voltage Vg of the charge transfer transistor is transited from a high voltage to a low voltage. As the gate voltage Vg of the charge transfer transistor is lowered, the charge transfer transistor can be turned off even though the operation mode transits to the read mode when the boosted voltage is low. Therefore, typical pump-up can be performed at the source voltage Vs, and the operation of the booster circuit can be stably performed. Similarly, this is also performed when the operation mode transits from the rewrite mode through the STOP mode to the read mode in FIG. 19. The voltage reset circuit is a unit which is useful in the mode conversion where the operation mode transits from the state where the boosted voltage Vpp is high to the state where the boosted voltage Vpp is low.

In the conventional booster circuit using the booster cell 902, however, the gate voltage Vg of the charge transfer transistor is always lowered when the gate voltage reset signal is H. Therefore, there is a case when the gate voltage Vg becomes lower than the source voltage Vs. In the STOP state, for example, the output voltage Vpp becomes the power source voltage Vdd, and the source voltage Vs also becomes the power source voltage Vdd. However, the gate voltage Vg becomes lower than the power source voltage Vdd. If the gate voltage Vg becomes lower than the source voltage Vs, the switching transistor M2 is turned on. Then, an electric current flows from the drain to the switching transistor M2 through the respective transistors M4 to M7 of the voltage reset circuit 903 such that consumed current or stop current at the time of operation transition increases.

Further, if the gate voltage Vg is excessively pulled out, the time (equalization time) when the drain voltage Vd and the gate voltage Vg are averaged so as to be held at the same potential through the switching transistor M2 immediately after the mode transition becomes insufficient. Further, the charge transfer transistor is not sufficiently turned on, the charge transfer efficiency decreases, and the recovery time of the booster circuit is lengthened.

SUMMARY OF THE INVENTION

An advantage of the present invention is that it provides a booster circuit with high reliability, in which when a low-voltage power source is used, when the operation mode transits from a mode when a high boosted voltage is output to a mode when a low boosted voltage is output, when a power source is restarted after being instantly stopped, or when a change in voltages of four-phase clock signals occurs, a charge transfer transistor can be turned on/off so that a stabilized boosting operation can be performed.

In order to achieve the above-mentioned object, the boosting circuit according to the present invention has a pull-out lower limit voltage supply section provided in a reset circuit such that a gate voltage Vg of the charge transfer transistor is reset to a reset potential of which the absolute value is higher than a pull-out lower limit voltage.

According to an aspect of the invention, a booster circuit includes n stage booster cells which are connected in series (n is an integer equal to or larger than 2), at least one booster cell among the booster cells at n stages including a charge transfer transistor that transfers charges from the preceding stage to the following stage; an output voltage boosting capacitor having one electrode connected to the output side of the charge transfer transistor and the other electrode to which a first clock signal having a predetermined phase is input; a gate voltage boosting capacitor having one electrode connected to the gate of the charge transfer transistor and the other electrode to which a second clock signal having a predetermined phase is input; and a switching transistor for connecting the gate of the charge transfer transistor to the input terminal of the charge transfer transistor; and a reset unit that pulls out stored charge of the gate such that a pull-out lower limit voltage and a control signal are input through a pull-out lower limit voltage supply section and a control signal supply section and an absolute value of a gate voltage of the charge transfer transistor in at least one booster cell among the booster cells does not fall below the pull-out lower limit voltage on the basis of the control signal.

In such a configuration, the gate voltage can be easily prevented from being excessively pulled out, regardless of an on period of control signal. Further, overcharging is suppressed through the switching transistor, and the recovery time of the booster circuit can be shortened. Accordingly, high-speed driving can be performed.

According to another aspect of the invention, the pull-out lower limit voltage is a power supply voltage.

In such a configuration, the pull-out lower limit voltage supply section does not need to generate a separate pull-out lower limit voltage, but a power supply voltage may be supplied as it is. Therefore, it is possible to simplify the circuit configuration. Further, since the power supply voltage is a stabilized voltage, noise is not generated, and as a result, the power supply voltage does not effect the operation.

According to a further aspect of the invention, the pull-out lower limit voltage is larger than or equal to an output voltage of the booster circuit.

In such a configuration, as an output voltage of the booster circuit is used for the pull-out lower limit voltage, it is possible to secure the breakdown voltage margin of a transistor. Further, since the gate voltage of the charge transfer transistor according to the output voltage can be pulled out, it is possible to further shorten the recovery time of the booster circuit.

According to a still further aspect of the invention, the pull-out lower limit voltage is equal to an output voltage of the booster circuit.

In such a configuration, a new voltage does not need to be generated.

According to a still further aspect of the invention, the pull-out lower limit voltage is larger than or equal to an input voltage of the booster circuit at the first stage.

In such a configuration, as the pull-out lower limit voltage is larger than or equal to an input voltage, it is possible to secure the potential difference between the input voltage and the gate voltage of the charge transfer transistor of the first stage booster cell. Further, it is possible to easily prevent a charge from being excessively pulled out. As such setting corresponds to only the booster cells at the initial and last stages, the amount of current consumed at the time of pull-out can be suppressed from increasing. In this case, since a charge can be excessively pulled out in the booster cells therebetween, an effect of suppressing the amount of consumed current can be achieved, and the recovery time is equal to that of the booster circuit described in Japanese Patent No. 3670642.

According to a still further aspect of the invention, the pull-out lower limit is an input voltage of the first stage booster circuit.

In such a configuration, a new voltage does not need to be generated, but the input voltage of the booster circuit at the initial stage may be applied as it is.

According to a still further aspect of the invention, the level of the pull-out lower limit voltage changes in accordance with a reset signal (the control signal) of the gate voltage.

In such a configuration, it is possible to secure the breakdown voltage margin of an internal circuit (element) of the reset circuit. Further, the level of the pull-out lower limit voltage may be set so that a voltage is received from another circuit.

According to a still further aspect of the invention, the pull-out lower limit voltage is applied to at least one or more booster cells, and pull-out lower limit voltages having different levels are applied to different booster cells.

In such a configuration, as the pull-out lower limit voltage suitable for each booster cell (because the gate voltage of the charge transfer transistor differs depending on a stage) is applied, overcharging can be suppressed, the breakdown voltage margin can be further secured, and the recovery time of the booster circuit can be shortened.

According to a still further aspect of the invention, the pull-out lower limit voltage is set so that the voltage level thereof changes in accordance with a change of the first and/or second clocks.

In such a configuration, as the booster circuit is synchronized with boosted four-phase clocks, it is possible to further secure the breakdown voltage margin of an internal circuit (element) of the reset circuit.

According to a still further aspect of the invention, the pull-out lower limit voltage has the same potential as the voltage at the input side or output side of the charge transfer transistor.

In such a configuration, the first stage booster cell (a booster cell close to the first stage booster cell) is preferably provided at the input side, because the gate voltage of the charge transfer transistor is close to an input voltage and an input voltage level is also required for the pull-out of charge. Further, the last stage booster cell (a booster cell close to the last stage booster cell) is preferably provided in the output side, because the gate voltage of the charge transfer transistor is close to an output voltage and an output voltage level is also required for the pull-out of charge.

According to a still further aspect of the invention, the booster circuit is configured so that a boosting operation is performed in the direction of a positive voltage.

The booster circuit configured in such a manner is useful for a positive booster circuit.

According to a still further aspect of the invention, the booster circuit is configured so that a boosting operation is performed in the direction of a negative voltage.

The booster circuit configured in such a manner is useful for a negative booster circuit.

According to the present invention, the gate voltage Vg of the charge transfer transistor is set to be larger than or equal to the pull-out lower limit voltage so as to perform the pull-out of charge even in the mode transition or when a power source is instantly stopped. Therefore, consumed current or leakage current caused by the overcharging can be suppressed from increasing, and an operation of the booster circuit can be stably performed.

Further, as the gate voltage Vg is set to be larger than or equal to the pull-out lower limit voltage, the gate voltage Vg can be suppressed from being excessively pulled out, and insufficient equalizing of the switching transistor can be suppressed. Therefore, the charge transfer efficiency can be suppressed from decreasing. Accordingly, the recovery time of the booster circuit can be shortened, and a redundant boosting operation can be suppressed to reduce the amount of consumed current.

Further, the breakdown voltage margin of the transistor and the capacitor can be sufficiently secured, and the above-described effect can be realized.

DESCRIPTION OF THE PREFERRED EMBODIMENTS

First Embodiment

Figure 1:
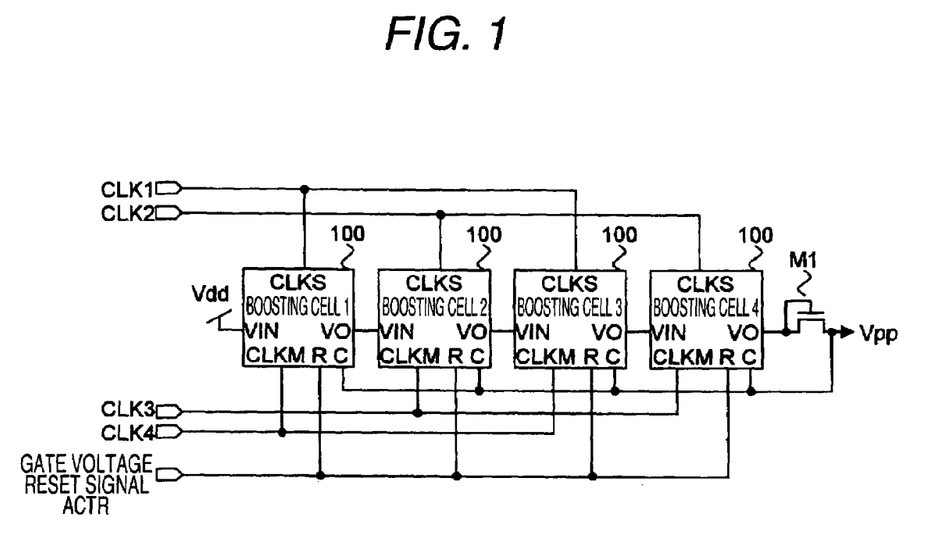
FIG. 1 is a block diagram illustrating a booster circuit according to a first embodiment of the present invention.
Figure 2:
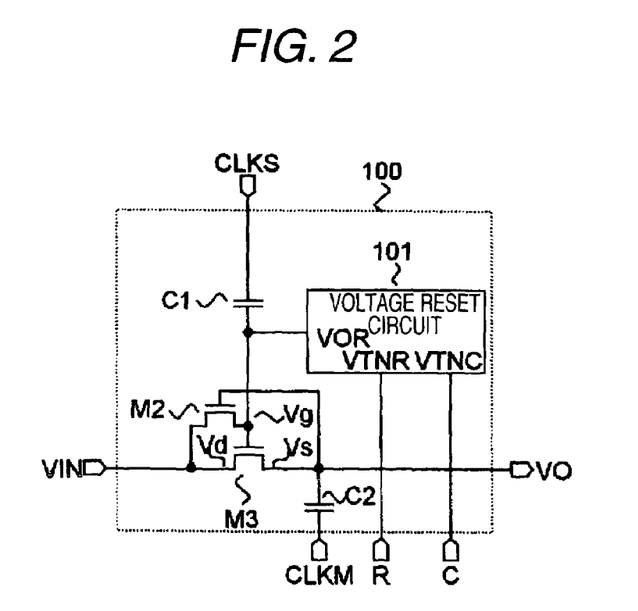
FIG. 2 is a diagram illustrating a booster cell according to the first embodiment of the invention.
Figure 3:
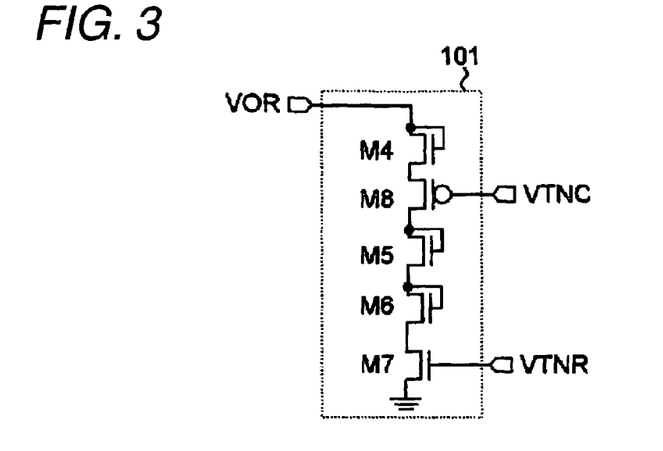
FIG. 3 is a diagram illustrating a voltage reset circuit according to the first embodiment of the invention.

Hereinafter, a booster circuit according to a first embodiment of the present invention will be described with reference to the drawings. FIG. 1 is a block diagram illustrating the configuration of a booster circuit according to the first embodiment, FIG. 2 is a diagram illustrating one booster cell composing the booster circuit, and FIG. 3 is a diagram illustrating a reset circuit of the booster cell. In this embodiment, there is provided a reset circuit 101 serving as a reset unit for pulling out stored charge of a gate. In such a configuration, a pull-out lower limit voltage and a control signal are input through a pull-out lower limit voltage supply section and a control signal supply section, and an absolute value of a gate voltage in a charge-transfer transistor of at least one of-the booster cells 100 does not fall below the pull-out lower limit voltage. Therefore, regardless of an on period of the control signal, a gate voltage can be easily prevented from being excessively pulled out. Further, overcharging can be suppressed by using a switching transistor, and the recovery time of the booster circuit can be shortened.

In other words, the booster circuit is provided with the four stage booster cells 100 which are connected in series. When performing a boosting operation, the booster cells 100 transfer charges from the preceding stage to the following stage to be synchronized with four phase clock signals CLK1 to CLK4 and pump up the transferred charges. Further, at the time of mode transition, the booster cells 100 use an output voltage Vpp of the booster circuit as a pull-out lower limit voltage so as to lower a gate voltage Vg of a charge transfer transistor to the pull-out lower limit voltage in accordance with a gate voltage reset signal ACTR. At the last stage, a reverse flow prevention circuit M1 is provided so as to prevent the reverse flow of the boosted voltage, and an output signal VPF is output. Reference numeral 101 represents a reset circuit which applies a pull-out lower limit voltage to a P channel transistor M8 and reduces a gate voltage Vg of the charge transfer transistor M3 similar to the pull-out lower limit voltage (around a threshold value Vt of the P channel-transistor) where the P channel transistor M8 is turned on if the gate voltage reset signal ACTR becomes H. Further, like reference numerals represent the same components as those described in the related art. For example, the booster circuit is set by connecting the four stage booster cells 100 in series.

Figure 4:
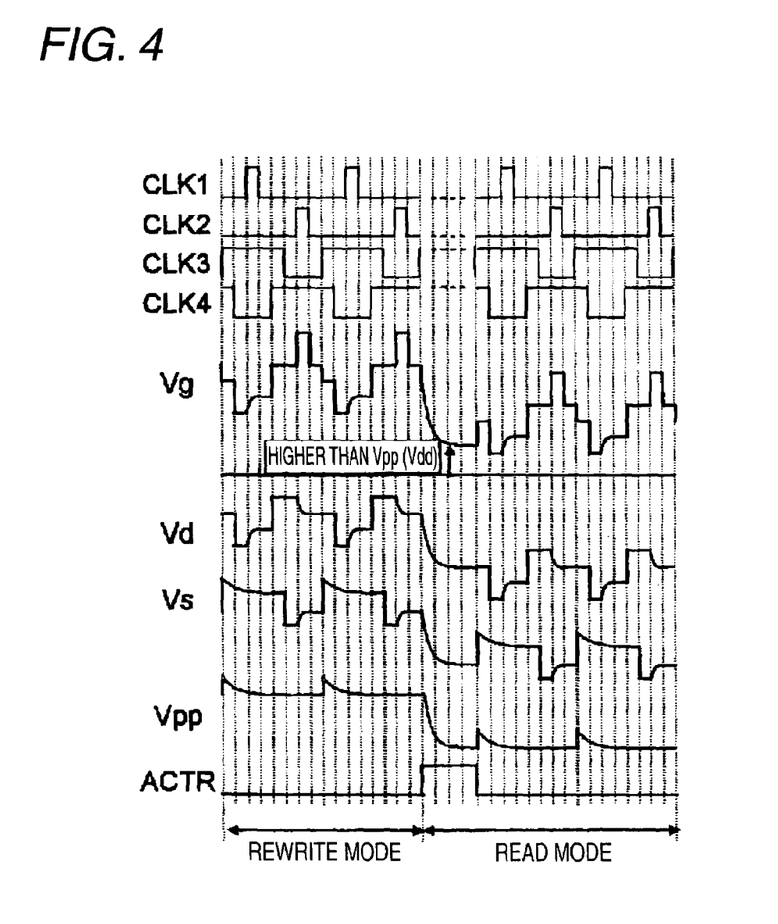
FIG. 4 is a waveform diagram according to the first embodiment.

Next, the operation of the booster circuit according to the first embodiment will be described with reference to FIG. 4.

In the rewrite mode, the gate voltage reset signal ACTR is fixed to L. Accordingly, the booster circuit repeatedly transfers and pumps up charges to be synchronized with four-phase clock signals CLK1 to CLK 4 so as to output a boosted voltage Vpp as an output signal, similar to that of the related art. When the mode is switched, the gate reset signal ACTR transits from L to H. The output voltage Vpp of the booster circuit is applied as a pull-out lower limit voltage of the voltage reset circuit 101. Therefore, a gate voltage Vg of the charge transfer transistor is set around (the output voltage of the booster circuit+Vt of the P channel transistor M8).

Figure 5:
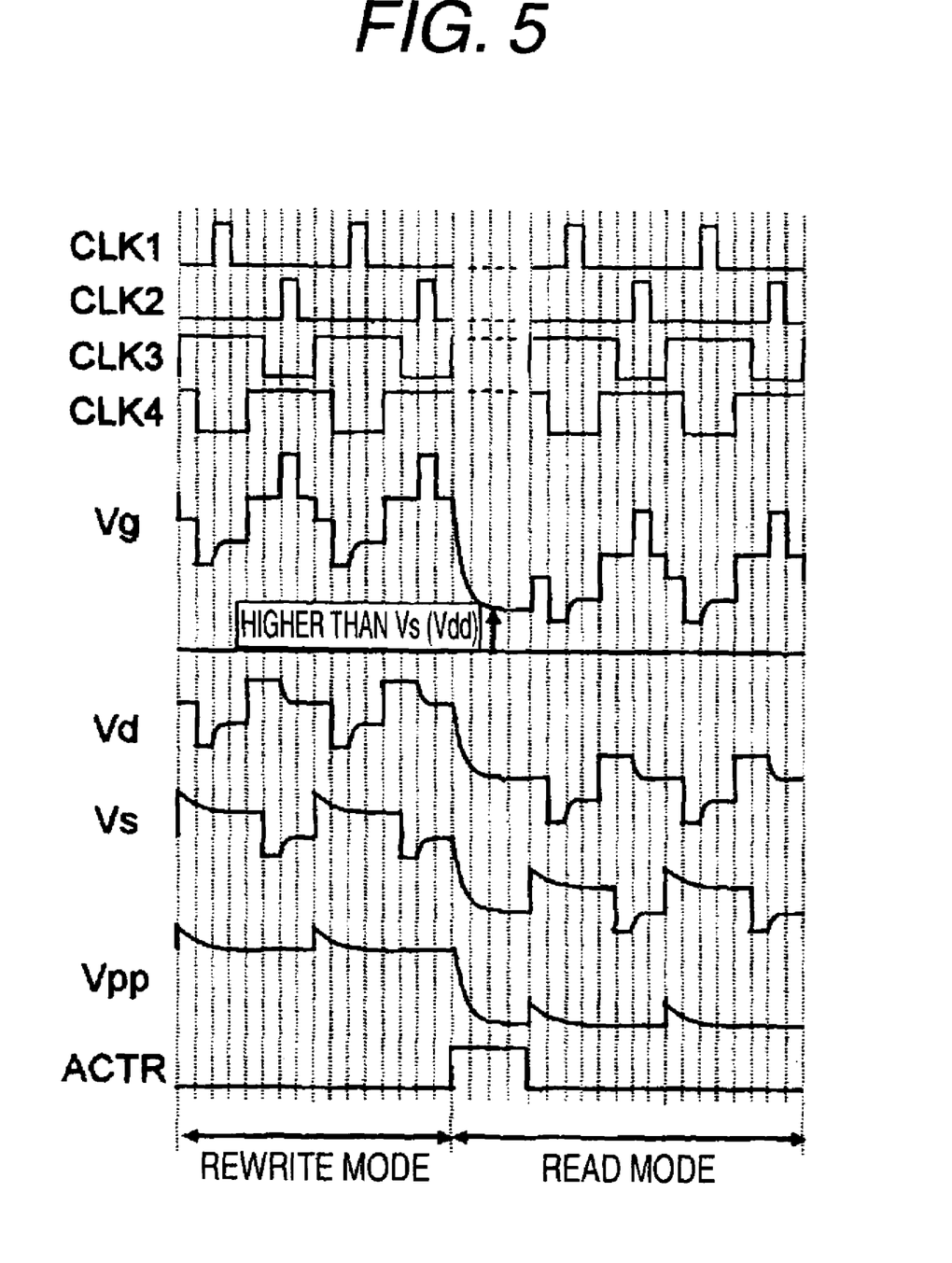
FIG. 5 is a waveform diagram according to the first embodiment.

That is, regardless of the time when the gate voltage reset signal becomes H, the gate voltage Vg of the charge transfer transistor can be set in accordance with the boosted voltage Vpp after the mode transition. FIG. 5 shows a case where the mode transits from the rewrite mode through a STOP mode to a read mode. However, the same operation as described above can be performed.

The configuration of the voltage reset circuit is only an example, and the circuit is not limited thereto if it has the same function. Further, the pull-out lower limit voltage of the first embodiment is also an example, and the voltage is not limited thereto if it has the same function as this embodiment. For example, even though the pull-out lower limit voltage of the first embodiment is set to an output voltage Vpp of the booster circuit, a pull-out lower limit voltage for pulling out a gate voltage of the charge transfer transistor M3 is not limited thereto. However, if there is no problem in breakdown voltages of a gate voltage boosting capacitor C1, an output voltage boosting capacitor C2, a switching transistor M2, and a transfer charge transistor M3, which are used in the booster cell 100, the pull-out lower limit voltage may be an input voltage Vdd of the booster circuit at the initial stage. Further, an output voltage from another power source or another circuit can be used as a pull-out lower limit voltage (not shown).

According to the booster circuit of the first embodiment, the gate voltage Vg is prevented from being excessively pulled out. Therefore, overcharging is not only be suppressed, but the recovery operation of the booster circuit is also performed quickly. Further, the redundant pumping operation can be avoided, so that the amount of consumed current can be reduced.

Second Embodiment

Next, a booster circuit according to a second embodiment of the invention will be described with reference to the drawings.

Figure 6:
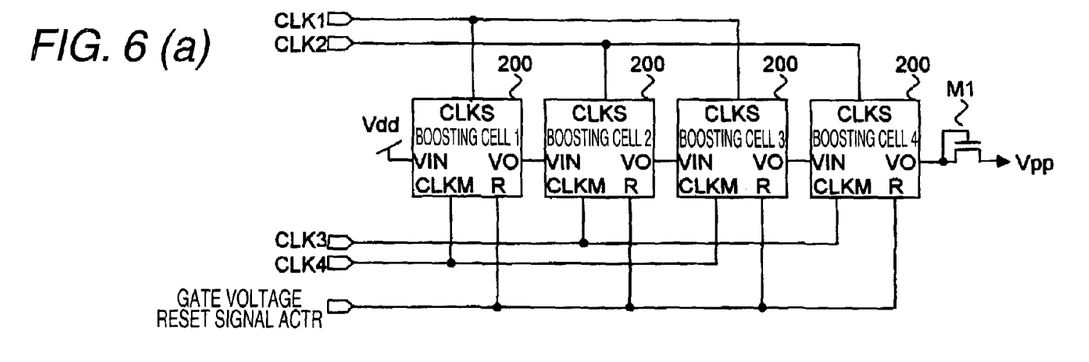
FIG. 6A is a block diagram illustrating a booster circuit according to a second embodiment of the invention.
FIG. 6B is a diagram illustrating a booster cell according to the second embodiment of the invention.

FIG. 6A is a block diagram illustrating the configuration of the booster circuit according to the second embodiment, and FIG. 6B is a diagram illustrating a booster cell in the booster circuit according to the second embodiment. When performing a boosting operation, the booster cells 200 transfer charges from the preceding stage to the following stage to be synchronized with four phase clock signals CLK1 to CLK4 and pump up the transferred charges. Further, at the time of mode transition, the booster cells 200 use a source voltage Vs of a charge transfer transistor M3, which is synchronized with a boosting clock as a pull-out lower limit voltage, so as to lower a gate voltage Vg of the charge transfer transistor to the pull-out lower limit voltage in accordance with a gate voltage reset signal ACTR. Further, reference symbol M1 represents a reverse flow prevention circuit for preventing the reverse flow of the boosted voltage. Reference numeral 101 represents a reset circuit which applies a pull-out lower limit voltage to a P channel transistor M8 and reduces a gate voltage Vg of the charge transfer transistor M3 near to the pull-out lower limit voltage (around a threshold value Vt of the P channel transistor) where the P channel transistor M8 is turned on if the gate voltage reset signal ACTR becomes H. Further, like reference numerals represent the same components as those described in the related art. For example, the booster circuit is set by connecting the four stage booster cells 200 in series.

Next, the operation of the booster circuit according to the second embodiment will be described.

In the rewrite mode, the gate voltage reset signal ACTR is fixed to L. Accordingly, the booster circuit repeats the transfer and pumping of charges to be synchronized with four-phase clock signals CLK1 to CLK4 such that a boosted voltage Vpp is output as an output voltage, similar to that of the related art. At this time, since the source voltage Vs of the charge transfer transistor is used as a pull-out lower limit voltage VTNC, the pull-out lower limit voltage VTNC is set to a voltage synchronized with the same clock operation as the source voltage Vs. When the mode is switched, the gate reset signal ACTR transits from L to H. With a voltage level set to the pull-out lower limit voltage of the voltage reset circuit 101, the source voltage Vs of the charge transfer transistor is applied. Therefore, a gate voltage Vg of the charge transfer transistor is set around (the source voltage Vs of the charge transfer transistor+Vt of the P channel transistor M8).

That is, regardless of whether the gate voltage reset signal ACTR becomes H or not, the gate voltage Vg of the charge transfer transistor can be set in accordance with the source voltage Vs of the charge transfer transistor.

The configuration of the voltage reset circuit is only an example, and the circuit is not limited thereto if it has the same function. Further, the pull-out lower limit voltage of the second embodiment is also an example, and the voltage is not limited thereto if it has the same function as this embodiment. For example, even though the pull-out lower limit voltage of the second embodiment is set to the source voltage Vs of the charge transfer transistor, a pull-out lower limit voltage for pulling out a gate voltage of the charge transfer transistor M3 is not limited thereto. However, in order to secure the breakdown voltage margin of a gate voltage boosting capacitor C1, an output voltage boosting capacitor C2, a switching transistor M2, and a transfer charge transistor M3, which are used in the booster cell 200, the voltage synchronized with four-phase clocks can be used (not shown).

According to the booster circuit of the second embodiment, the breakdown voltage margin is secured, and the gate voltage Vg is prevented from being excessively pulled out. Therefore, overcharging is not only be suppressed, but the recovery operation of the booster circuit is also performed quickly.

Further, the redundant pumping operation can be avoided, so that the amount of consumed current can be reduced.

Third Embodiment

Figure 7:
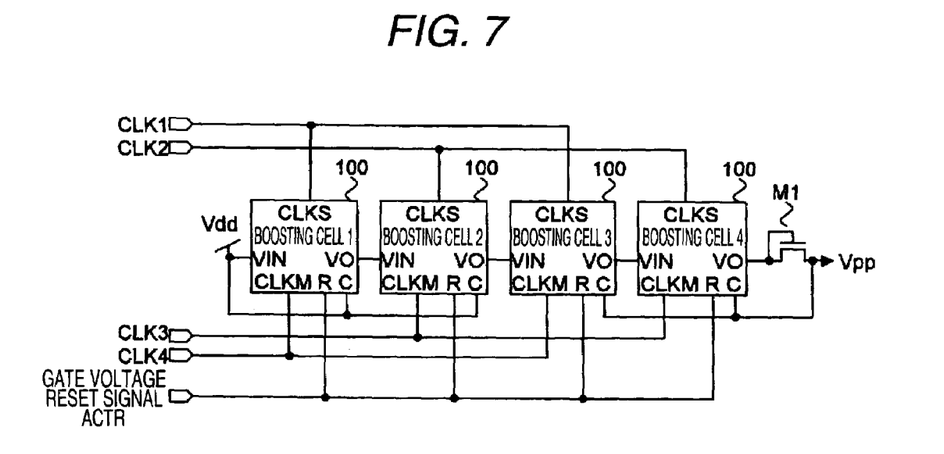
FIG. 7 is a diagram illustrating a booster cell according to a third embodiment of the invention.

In the second embodiment, the pull-out lower limit voltage is set to the source voltage of the charge transfer transistor M3. In this embodiment, however, a pull-out lower limit voltage C in the first and second stage booster cells is set to an input voltage VIN of the booster circuit at the initial stage, and a pull-out lower limit voltage C in the third and fourth stage booster cells is set to an output voltage Vpp of the charge transfer transistor, as shown in FIG. 7.

The pull-out lower limit voltage may be set to be equal to or larger than an input voltage of the booster circuit at the initial stage or an output voltage of the booster circuit.

As the input and output voltages of the booster circuit are used for the pull-out lower limit voltage, it is possible to secure the breakdown voltage margin of the transistor. Further, since the gate voltage of the charge transfer transistor according to the output voltage can be pulled out, the recovery time of the booster circuit can be further shortened. Further, as the input voltage VIN of the booster circuit at the initial stage or the output voltage Vpp is used as the pull-out lower limit voltage without generating a new voltage, a new voltage generating circuit is not needed.

Fourth Embodiment

Next, a fourth embodiment of the invention will be described.

Figure 8:
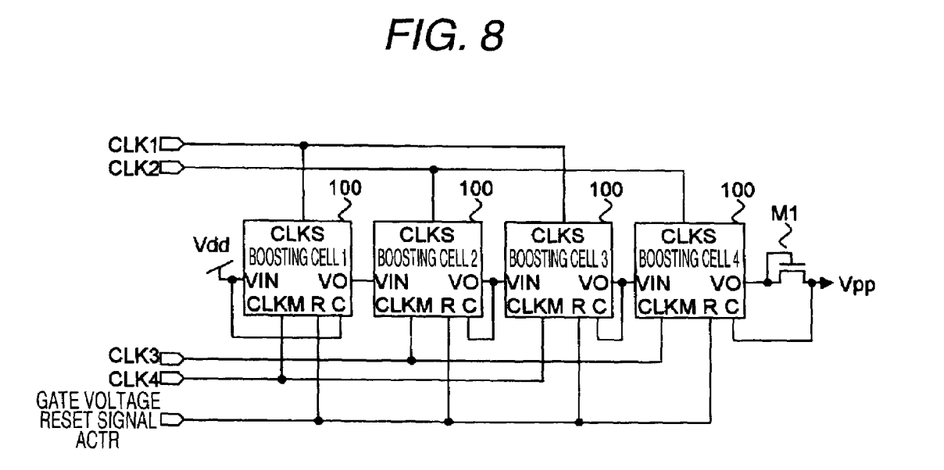
FIG. 8 is a diagram illustrating a booster cell according to a fourth embodiment of the invention.

In the above-described embodiments, the pull-out lower limit voltage C in the first and second stage booster cells is set to an input voltage VIN of the first stage booster circuit, and the pull-out lower limit voltage C in the third and fourth stage booster cells is set to an output voltage Vpp of the charge transfer transistor. In this embodiment, however, the pull-out lower limit voltage C in the first stage booster cell is set to an input voltage VIN of the boosting circuit at the initial stage, and the pull-out lower limit voltage C in the booster cells at the second or higher stages is set to the same potential as an output voltage of the booster circuit at the respective stages, as shown in FIG. 8. The pull-out lower limit voltage C is synchronized with four-phase clocks.

In such a configuration, the input voltage VIN of the first stage booster circuit can be used as the pull-out lower limit voltage at the initial stage, without generating a new voltage. Further, as the pull-out lower limit voltage in all the booster cells excluding the first stage booster cell is set to an output voltage of the booster circuit at the respective stages, it is possible to secure the potential difference between the input voltage and the gate voltage of the charge transfer transistor of the first stage booster cell. Further, the charges are easily prevented from being excessively pulled out.

When the pull-out lower limit voltage is set to an output voltage of the booster circuit, the pull-out lower limit voltage is set to the same potential as the voltage at the input side or output side of the charge transfer transistor. However, the first stage booster cell (or the booster cell close to the first stage booster cell) is preferably provided at the input side, because the gate voltage of the charge transfer transistor is similar to the input voltage and an input voltage level is also required to pull out the charge. Further, the last stage booster cell (the booster cell close to the last stage booster cell) is preferably provided in the output side, because the gate voltage of the charge transfer transistor is similar to the output voltage and an output voltage level is also required to pull out the charge.

As such setting of the pull-out lower limit voltage corresponds to only the first and last stage booster cells, the amount of current consumed at the time of the pull-out can be suppressed from increasing. In this case, since excessive pull-out can be performed in the booster cells between the initial and last stages, an effect of suppressing the amount of consumed current can be achieved, and the recovery time is equal to that described in Patent Document 1.

Fifth Embodiment

Next, a fifth embodiment of the invention will be described.

Figure 9:
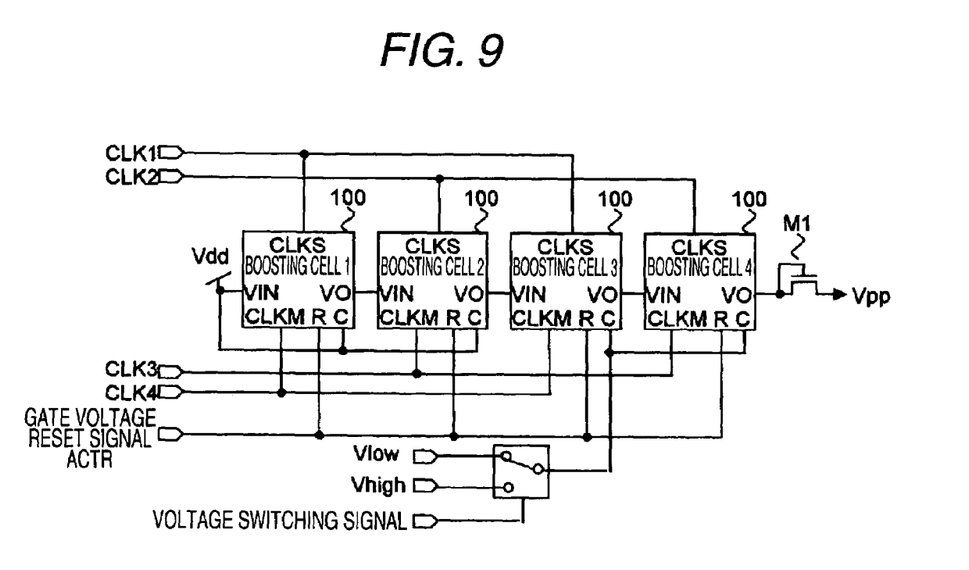
FIG. 9 is a diagram illustrating a booster cell according to a fifth embodiment of the invention.

In this embodiment, a pull-out lower limit voltage can be switched over from Vlow to Vhigh in accordance with a voltage switching signal SWS, as shown in FIG. 9, and the level of the pull-out lower limit voltage changes in accordance with a reset signal of the gate voltage (the control signal).

In such a configuration, it is possible to secure the breakdown voltage margin of an internal circuit (element) of the reset circuit. Further, the level of the pull-out lower limit voltage may be set so that a voltage is received from another circuit.

Sixth Embodiment

Next, a sixth embodiment of the invention will be described.

In this embodiment, a pull-out lower limit voltage is applied to at least one or more booster cells, and pull-out lower limit voltages having different levels are applied to different booster cells. For example, as shown in FIG. 8, the pull-out lower limit voltage for each boosting stage is set to the same potential as an output voltage of each of the booster cells. Further, the pull-out lower limit voltage at the initial stage may be set to the same potential as an input voltage and the pull-out lower limit voltage at the last stage may be set to an output voltage of the charge transfer transistor, such that the pull-out lower limit voltages having appropriate voltage levels are independently applied.

As the pull-out lower limit voltage suitable for each booster cell (because a gate voltage of the charge transfer transistor varies at each stage) is applied, overcharging can be suppressed, the breakdown voltage margin can be further secured, and the recovery time of the booster circuit can be shortened.

Further, the level of the pull-out lower limit voltage may be set so as to change in accordance with a change in both of the first and second clocks or one of them. In such a configuration, as the pull-out lower limit voltage is synchronized with four-phase boosting clocks, it is possible to further secure the breakdown voltage margin of an internal circuit (element) of the reset circuit.

The pull-out lower limit voltage may be set to the same level as the voltage at the input side or output side of the charge transfer transistor.

In such a configuration, since the gate voltage of the charge transfer transistor is close to an input voltage and an input voltage level is also required for the pull-out of charge, the first stage booster cell (or a booster cell close to the first stage booster cell) is preferably provided at the input side. Further, since the gate voltage of the charge transfer transistor is close to an output voltage and an output voltage level is also required for the pull-out of charge, the last stage booster cell (or a booster cell close to the last stage booster cell) is preferably provided in the output side.

In the booster circuit according to the present invention, boosting characteristics thereof are improved, and the stability of operation can be increased due to the reduction in the amount of consumed current and the shortening of recovery time. Therefore, the booster circuit is useful for setting the rewrite mode and read mode of a non-volatile semiconductor storage device. Further, the booster circuit can be applied to volatile semiconductor devices such as DRAM, liquid crystal devices, power supply circuits of mobile equipments and the like.

What is claimed is:

1. A booster circuit comprising:
    n stage booster cells which are connected in series (n is an integer equal to or larger than 2), at least one booster cell among the n stage booster cells including:
    a charge transfer transistor that transfers charges from the preceding stage to the following stage;
    an output voltage boosting capacitor having one electrode connected to the output side of the charge transfer transistor and the other electrode to which a first clock signal having a predetermined phase is input;
    a gate voltage boosting capacitor having one electrode connected to a gate of the charge transfer transistor and the other electrode to which a second clock signal having a predetermined phase is input; and
    a switching transistor for connecting the gate of the charge transfer transistor to an input terminal of the charge transfer transistor; and
    a reset unit that pulls out a stored charge of the gate such that a pull-out lower limit voltage and a control signal are input through a pull-out lower limit voltage supply section and a control signal supply section and an absolute value of a gate voltage of the charge transfer transistor in at least one booster cell among the booster cells does not fall below the pull-out lower limit voltage on the basis of the control signal.

2. The booster circuit according to claim 1, wherein the pull-out lower limit voltage is a power supply voltage.

3. The booster circuit according to claim 1, wherein the pull-out lower limit voltage is larger than or equal to an output voltage of the booster circuit.

4. The booster circuit according to claim 1, wherein the pull-out lower limit voltage is equal to an output voltage of the booster circuit.

5. The booster circuit according to claim 1, wherein-the pull-out lower limit voltage is larger than or equal to an input voltage of the booster circuit at the first stage.

6. The booster circuit according to claim 1, wherein the pull-out lower limit is an input voltage of the booster circuit at the first stage.

7. The booster circuit according to claim 1, wherein the level of the pull-out lower limit voltage changes in accordance with a reset signal (the control signal) of the gate voltage.

8. The booster circuit according to claim 1, wherein the pull-out lower limit voltage is applied to at least one or more booster cells, and pull-out lower limit voltages having different levels are applied to different booster cells.

9. The booster circuit according to claim 1, wherein the pull-out lower limit voltage is set so that the voltage level thereof changes in accordance with a change of the first and/or second clock.

10. The booster circuit according to claim 1, wherein-the pull-out lower limit voltage has the same potential as the voltage of the input side or output side of the charge transfer transistor.

11. The booster circuit according to claim 1, wherein the booster circuit is configured so that a boosting operation is performed in the direction of a positive voltage.

12. The booster circuit according to claim 1, wherein the booster circuit is configured so that a boosting operation is performed in the direction of a negative voltage.

13. A semiconductor integrated circuit device in which the booster circuit according to claim 1 is integrated.

* * * * *